(12) United States Patent
da Mata Cecilio et al.

(10) Patent No.: US 12,282,971 B2
(45) Date of Patent: Apr. 22, 2025

(54) DISTRIBUTED ENERGY RESOURCE SYSTEM DESIGN AND OPERATION

(71) Applicant: Schlumberger Technology Corporation, Sugar Land, TX (US)

(72) Inventors: Ines da Mata Cecilio, Cambridge (GB); Matthieu Simon, Clamart (FR); Simon Bittleston, Suffolk (GB); Sylvain Thierry, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/320,256

(22) Filed: May 14, 2021

(65) Prior Publication Data

US 2021/0358058 A1 Nov. 18, 2021

Related U.S. Application Data

(60) Provisional application No. 63/024,798, filed on May 14, 2020.

(51) Int. Cl.
*G06Q 10/0631* (2023.01)
*G05B 15/02* (2006.01)
(Continued)

(52) U.S. Cl.
CPC .............. *G06Q 50/06* (2013.01); *G05B 15/02* (2013.01); *G06Q 10/0631* (2013.01);
(Continued)

(58) Field of Classification Search
USPC ...................................................... 700/286
See application file for complete search history.

(56) References Cited

U.S. PATENT DOCUMENTS 9,887,544 B2 2/2018 Greer et al.
2010/0179704 A1* 7/2010 Ozog ............... G06Q 10/06315
703/2

(Continued)

FOREIGN PATENT DOCUMENTS

JP 2015531585 A 11/2015
WO 2019243524 A1 12/2019

OTHER PUBLICATIONS

Cotton et al., U.S. Appl. No. 63/011,704, filed Apr. 17, 2020, 72 pages. (Year: 2020).*

(Continued)

*Primary Examiner* — Emilio J Saavedra
(74) *Attorney, Agent, or Firm* — Jeffrey D. Frantz

(57) ABSTRACT

An energy management system for enhancing design and operation of a distributed energy resource system includes a two-level design system and a hierarchical optimization-based control system. The two-level design system includes a top-level designer configured to coordinate decentralized bottom-level designers for individual energy resources to seek a global target for the designed distributed energy resource system that satisfies the energy demand of a target deployment location within a confidence level, and multiple bottom-level designers configured to enhance detailed designs of local energy sub-systems. The hierarchical optimization-based control system include a primary controller configured to determine a long-term operational schedule based on long-term constraints and future events at a first level, one or more secondary controllers configured to control daily orchestrations of the distributed energy resource system during operation at a second level, and multiple tertiary controllers and aggregators configured to rapidly adjust various hardware at a third level.

20 Claims, 6 Drawing Sheets

(51) Int. Cl.
  *G06Q 10/067* (2023.01)
  *G06Q 50/06* (2012.01)
  *H02J 3/38* (2006.01)

(52) U.S. Cl.
  CPC ............ *G06Q 10/067* (2013.01); *H02J 3/381* (2013.01); *Y02P 80/20* (2015.11); *Y04S 10/12* (2013.01)

(56) References Cited

U.S. PATENT DOCUMENTS

| | | | |
|---|---|---|---|
| 2012/0029897 A1* | 2/2012 | Cherian | H02J 13/00034 703/18 |
| 2014/0350743 A1* | 11/2014 | Asghari | G05B 13/048 700/297 |
| 2016/0347195 A1 | 12/2016 | Bridges et al. | |
| 2019/0147118 A1* | 5/2019 | Benjamin | G06Q 10/063 703/1 |
| 2019/0154288 A1 | 5/2019 | Adirim | |
| 2020/0076196 A1 | 3/2020 | Lee | |
| 2020/0119557 A1 | 4/2020 | Claessens et al. | |
| 2020/0381919 A1* | 12/2020 | Meier | H02J 3/06 |
| 2021/0011439 A1* | 1/2021 | Goverde | G05F 1/66 |
| 2021/0325069 A1* | 10/2021 | Cotton | B60L 53/30 |

OTHER PUBLICATIONS

International Search Report and Written Opinion issued in the PCT Application PCT/US2021/032395, dated Aug. 31, 2021 (11 pages).

Coninck et al., (2016) Practical Implementation and evaluation of model predictive control for an office building in Brussels, Energy and Buildings 111 (2016) 290-298.

O'Dwyer et al., (2019) Cooriditation of district-level smart energy systems: multi-objective considerations, 5th International conference on Smart Energy Systems, Copenhagen, Sep. 10-11, 2019 (15 pages).

Sturzenegger et al., (2016) Model Predictive Climate Control of a Swiss Office Building: Implementation, Results, and Cost-Benefit Analysis, IEEE Transactions on control systems tehonology, vol. 24, No. 1, Jan. 2016 (12 pages).

Dou, C.-X. et al., "Multi-Agent Based Hierarchical Hybrid Control for Smart Microgrid", IEEE Transactions on Smart Grid, 2013, 4(2), 8 pages.

Anonymous, "Energy management system—Wikipedia", Apr. 29, 2020, retrieved from the Internet on Apr. 4, 2024 from [URL:https://en.wikipedia.org/w/index.phptitle=Energy_management_system oldid=953882902], 3 pages.

* cited by examiner

DISTRIBUTED ENERGY RESOURCE SYSTEM DESIGN AND OPERATION

CROSS REFERENCE TO RELATED APPLICATION

This application claims priority from and the benefit of U.S. Provisional Application Ser. No. 63/024,798 entitled "Optimal Design and Operation of a Distributed Energy Resource System", filed May 14, 2020, which is hereby incorporated by reference in its entirety.

BACKGROUND

The present disclosure relates generally to model-based design and operation for a distributed energy resource system.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Distributed energy resource systems may include a variety of renewable energy sources, such as geothermal, solar power, wind power, small-scale hydroelectric, biomass, biogas, or a combination thereof. Unlike conventional power systems, such as centralized electrical power grid systems, the distributed energy resource systems may be decentralized, modular, and more flexible systems that are located close to the loads they serve. The distributed energy resource systems may include multiple energy generation and storage components that may be designed and operated within an intelligent or smart grid. Distributed energy generation and storage may enable collection of energy from different energy sources and may lower environmental impact and/or reduce cost of energy usage.

Integration of various energy resources (e.g., electrical, geothermal, solar, wind power, etc.) may present challenges for distributed energy resource system design and operation. For example, the geothermal, solar, and wind power may be influenced by the uncertain nature of these energy resources (e.g., ground or subsurface temperature variations, weather variations, etc.). In some cases, the design and/or operation (e.g., coordination of different energy resources) of the distributed energy resource systems may be influenced by non-environmental factors, such as changes of the electricity price or a power contract.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In certain embodiments, an energy management system for a distributed energy resource system includes a design system and a hierarchical optimization-based control system. The design system includes a top-level designer configured to coordinate decentralized bottom-level design routines for individual energy resources to seek a global design at a top level based on design input for the distributed energy resource system that satisfies an energy demand of a target deployment location within a confidence level. The design system also includes multiple bottom-level designers configured to execute the decentralized bottom-level design routines to generate detailed designs of multiple local energy sub-systems. The top-level designer utilizes at least a portion of the detailed designs to update the global design at the top level. The design system also includes a user interface configured to provide the design input to the top-level designer and the multiple bottom-level designers and to output the global design and the detailed designs. The hierarchical optimization-based control system includes a primary controller configured to determine a long-term operational schedule based on long-term constraints and future events at a first level, one or more secondary controllers configured to control daily or short-term (e.g., 2 days, 4 days, 1 week, etc.) orchestrations of the distributed energy resource system at a second level, and multiple tertiary controllers configured to rapidly adjust various hardware at a third level.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
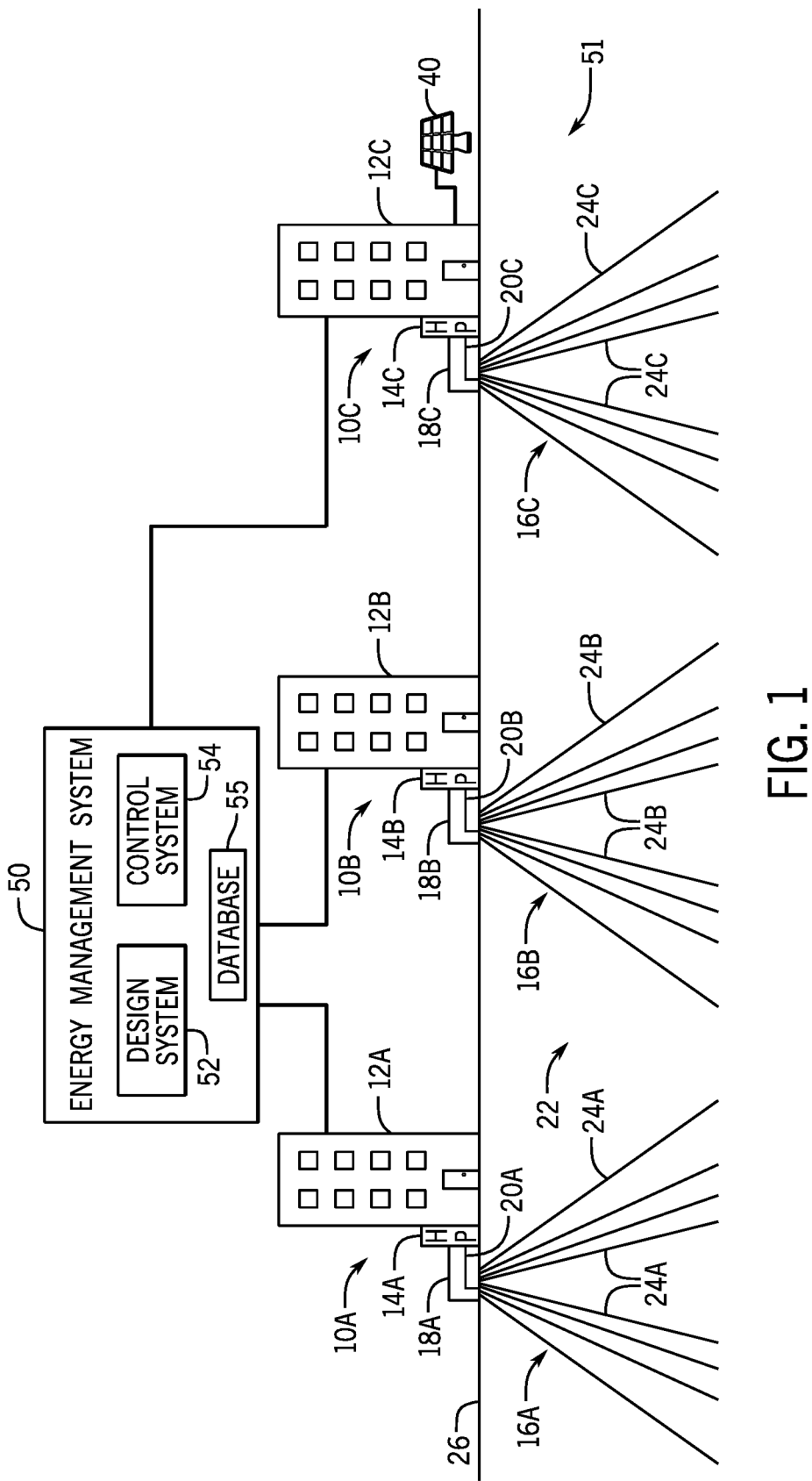
FIG. 1 is a schematic diagram of an embodiment of an energy management system implemented for design and control of a distributed energy resource system, in which the energy management system includes a design system and a control system.

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Example methods, devices, systems, and applications are described herein. It should be understood that the word "example" is used here to mean serving as an example, instance, or illustration. Any embodiment or feature described herein as being an example is not necessarily to be constructed as advantageous over other embodiments or features unless stated as such. Different embodiments can be utilized and changes can be made without departing from the scope of the subject matter presented herein.

Further, any enumeration of elements, blocks, or process steps in this specification is for purpose of clarity. Therefore, such enumeration should not be interpreted to imply that these elements, blocks, or process steps adhere to a particular arrangement or are carried out in a particular order.

Additionally, when introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Introduction

As explained above, integration of different energy resources (e.g., electrical, geothermal, solar, wind power, etc.) may be challenging for a distributed energy resource system design and/or operation. In some cases, design and/or operation (e.g., coordination of different energy resources) of the distributed energy resource system may be influenced by environmental factors (e.g., ground and/or subsurface temperature variations, weather variations, etc.) that may cause variations in the performance of geothermal system(s), solar power system(s), wind power system(s), or a combination thereof, used in the distributed energy resource system. In some cases, the design and/or operation of the distributed energy resource system may be influenced by non-environmental factors, such as changes of the electricity price, a power contract, other relevant factor(s), or a combination thereof.

In certain embodiments, a two-level design system, including a top-level designer and multiple bottom-level designers, may be used to design and/or enhance the design of a distributed energy resource system, which may be utilized for residences, commercial and industrial facilities, multi-building commercial and industrial sites, university campuses, schools, hospitals, municipalities, remote locations and islands, and the like. In some cases, the two-level design system may provide an enhanced design for an established distributed energy resource system, which may be undergoing certain changes (e.g., modifications). The two-level design system may include an intelligent top-level aggregator designer that coordinates the decentralized engineering design routines (e.g., the bottom-level design routines executed by the bottom-level designers to generate detailed designs for individual energy resources) to seek a global target for the designed energy system that satisfies the energy demand of a target deployment location within a confidence level. In certain embodiments, the two-level design system may provide characterizations of energy consumptions of the target deployment location at an aggregated location level, facility levels, appliance levels, piping levels, and so forth.

Furthermore, in certain embodiments, a hierarchical optimization-based control system may be used to provide control for a distributed energy resource system during operation. The hierarchical optimization-based control system may include a primary controller at a first level (e.g., a top level), one or more secondary controllers at a second level (e.g., a lower level), and multiple tertiary controllers and aggregators at a third level (e.g., a bottom level). The one or more secondary controllers configured to enhance daily or short-term (e.g., 2 days, 4 days, 1 week, etc.) orchestration of the distributed energy resource system during operation may be overlaid by the primary controller configured to determine a long-term operational schedule based on long-term constraints and future events at a top-level. The multiple tertiary controllers and aggregators may be communicatively connected to the primary controller and the one or more secondary controllers, and the tertiary controllers and aggregators may be configured to rapidly adjust various hardware components, such as loads, sensors, renewable energy generation elements, energy storage elements, elements with long timescale, or a combination thereof, to target operational conditions based on a determined plan, schedule, instructions, or a combination thereof, from the primary controller and the one or more secondary controllers. Within the hierarchical optimization-based control system, the primary controller may use a simplified description of the distributed energy resource system to generate longer-term solutions (e.g., a top-level plan or schedule), and then pass one or more near-term portions of the top-level plan or schedule, such as requirements for the day ahead, to the one or more secondary controllers to be refined down to a level of set-points of the distributed energy resource system, which may be sent to the multiple tertiary controllers and aggregators to adjust corresponding hardware components (e.g., temperature control, environmental sensing, energy generation, etc.).

Example Energy Management System

FIG. 1 is a schematic diagram of an embodiment of an energy management system implemented for design and control of a distributed energy resource system, in which the energy management system includes a design system and a control system. In the illustrated embodiment, the distributed energy resource system includes multiple heat pump systems, such as heat pump systems 10A, 10B, and 10C. Each heat pump system may be used to provide heat or cold within a building. For example, the first heat pump system 10A may be used to provide heat or cold within a first building 12A, the second heat pump system 10B may be used to provide heat or cold within a second building 12B, and the third heat pump system 10C may be used to provide heat or cold within a third building 12C.

In certain embodiments, different configurations of the distributed energy resource system may be designed or implemented. For example, multiple geothermal systems (e.g., the heat pump systems) may be used in a target location (e.g., a campus) including multiple buildings. Each building may have a heat pump, but some building(s) may not have a geothermal system. A surface pipe network may be used to connect different sub-surface geothermal heat exchangers, such that geothermal resources (e.g., the geothermal systems) can be shared between different buildings.

As illustrated, each heat pump system may include a heat pump and a geothermal system. For example, the first heat pump system 10A may include a first heat pump 14A and a first geothermal system 16A. The first heat pump 14A is configured to control the temperature within the first building 12A, and the first geothermal system 16A is configured to provide heat transfer fluid to the first heat pump 14A and to receive the heat transfer fluid from the first heat pump 14A. For example, to increase the temperature of air within the first building 12A, the first heat pump 14A may transfer heat from the heat transfer fluid to the air, thereby heating the air. Transferring heat from the heat transfer fluid to the air reduces the temperature of the heat transfer fluid. The cooler heat transfer fluid flows into the first geothermal system 16A via an inlet conduit 18A, and the first geothermal system 16A increases the temperature of the heat transfer fluid. The warmer heat transfer fluid then flows back to the first heat pump 14A via an outlet conduit 20A. In addition, to reduce the temperature of the air within the first building 12A, the first heat pump 14A may transfer heat from the air to the heat transfer fluid, thereby cooling the air. Transferring heat from the air to the heat transfer fluid increases the temperature of the heat transfer fluid. The warmer heat transfer fluid flows into the first geothermal system 16A via the inlet conduit 18A, and the first geothermal system 16A reduces the temperature of the heat transfer fluid. The cooler heat transfer fluid then flows back to the first heat pump 14A via the outlet conduit 20A.

Within the first geothermal system 16A, heat is transferred between the ground 22 and the heat transfer fluid. In the illustrated embodiment, the geothermal system 16A includes multiple geothermal heat exchangers 24A, and each geothermal heat exchanger is disposed within a respective wellbore/borehole within the ground 22. Each geothermal heat exchanger is configured to receive the heat transfer fluid from the inlet conduit 18A, to facilitate heat transfer between the heat transfer fluid and the ground 22, and to enable the heat transfer fluid to flow to the outlet conduit 20A. For example, while the first heat pump 14A is cooling the air within the first building 12A, each geothermal heat exchanger 24A may facilitate transfer of heat from the warmer heat transfer fluid to the ground 22. In addition, while the first heat pump 14A is heating the air within the first building 12A, each geothermal heat exchanger 24A may facilitate transfer of heat from the ground 22 to the cooler heat transfer fluid. The first geothermal system 16A may utilize any suitable type of heat transfer fluid, such as water, propylene glycol, ethylene glycol, or a combination thereof. Furthermore, while the first heat pump system 10A includes a single inlet conduit 18A and a single outlet conduit 20A in the illustrated embodiment, in other embodiments, the heat pump system may include additional inlet conduit(s) (e.g., 1, 2, 3, 4, or more additional inlet conduits) and/or additional outlet conduit(s) (e.g., 1, 2, 3, 4, or more additional outlet conduits), in which each inlet/outlet conduit is fluidly coupled to a respective geothermal heat exchanger or a respective group of geothermal heat exchangers. For example, the heat pump system may include an inlet conduit and an outlet conduit for each geothermal heat exchanger of the geothermal system.

The temperature control within the first building 12A described above may be applied to the other buildings, such as to the second building 12B via a second heat pump 14B, a second geothermal system 16B, an inlet conduit 18B, an outlet conduit 20B, and geothermal heat exchangers 24B, and/or to the third building 12C via a third heat pump 14C, a third geothermal system 16C, an inlet conduit 18C, an outlet conduit 20C, and geothermal heat exchangers 24C. Additionally, any variation disclosed above with regard to the first heat pump system 10A may be applied to the second heat pump system 10B and/or the second heat pump system 10C.

Furthermore, each geothermal heat exchanger may have any suitable configuration. For example, in certain embodiments, at least one geothermal heat exchanger may include a single U-tube, in which the heat transfer fluid flows into a first passage of the single U-tube from the heat pump, along a length of the first passage (e.g., which extends along a substantial portion of a length of the respective wellbore), through a U-bend, along a length of a second passage of the single U-tube, and then back to the heat pump. Furthermore, in certain embodiments, at least one geothermal heat exchanger may include multiple U-tubes, in which each U-tube is positioned at any suitable location within the wellbore and oriented at any suitable angle within the well bore. In such embodiments, the heat transfer fluid may flow through each U-tube along the path disclosed above with regard to the single U-tube. Furthermore, in certain embodiments, at least one geothermal heat exchanger may include one or more co-axial tubes, in which each co-axial tube has an inner flow path and an outer flow path. In such embodiments, the heat transfer fluid may flow into the inner flow path from the heat pump, along a length of the inner flow path (e.g., which extends along a substantial portion of a length of the respective wellbore), through an end portion of the co-axial tube, along a length of the outer flow path, and then back to the heat pump. Alternatively, the heat transfer fluid may flow into the outer flow path from the heat pump, along a length of the outer flow path (e.g., which extends along a substantial portion of a length of the respective wellbore), through an end portion of the co-axial tube, along a length of the inner flow path, and then back to the heat pump. As previously discussed, as the heat transfer fluid flows through each geothermal heat exchanger, heat is transferred between the ground and the heat transfer fluid.

Each wellbore may be formed by a drilling machine. The drilling machine may include a drilling string having a drill bit at the distal (e.g., lower) end. The drilling machine may drive the drilling string to rotate while urging the drill bit into the ground 22, thereby forming the wellbore. During the drilling process, drilling fluid (e.g., mud) may be injected into the wellbore. The drilling fluid is configured to cool the drill bit, provide lubrication for the drilling process, and convey cuttings to the surface, among other functions. The drilling machine includes a mast that supports the drilling string. In certain embodiments, the mast may be oriented at various angles relative to a surface 26 of the ground 22, thereby enabling the drilling machine to form wellbores at various angles relative to the surface 26. After each wellbore is formed, a geothermal heat exchanger (e.g., the geothermal heat exchanger 24A) may be disposed within a corresponding wellbore, and cement may be injected into the corresponding wellbore to secure the geothermal heat exchanger in the target position within the corresponding wellbore.

In the illustrated embodiment, each wellbore/geothermal heat exchanger is angled relative to a line extending perpendicularly to the surface 26 of the ground 22. However, in other embodiments, at least one wellbore/geothermal heat exchanger may be substantially parallel to the line extending perpendicularly to the surface 26. Furthermore, in certain embodiments, at least one wellbore/geothermal heat exchanger may extend along a deviated path from a wellhead container into the ground 22. For example, the deviated path may include a first section extending substantially parallel to the line extending perpendicularly to the surface 26 and a second section extending at an angle relative to the line extending perpendicularly to the surface 26.

In certain embodiments, at least one building may be connected to a respective heat pump system and to one or more renewable energy generation systems, such as a solar power system, a wind power system, a small-scale hydroelectric power system, a biomass power system, a biogas power system, another suitable renewable energy system, or a combination thereof. For example, the third building 12C is connected to the third geothermal system 16C and to a solar power system 40. The solar power system 40 may provide additional electrical power to the third building 12C.

In the illustrated embodiment, an energy management system 50 is communicatively connected to a distributed energy resource system 51. The distributed energy resource system 51 includes one or more heat pump systems (e.g., 10A, 10B, and 10C), and one or more renewable energy generation systems, including but not limited to solar power systems (e.g., the solar power system 40), wind power systems, small-scale hydroelectric power systems, biomass power system, biogas power systems, any other suitable renewable energy systems, or combinations thereof. In certain embodiments, the distributed energy resource system 51 may be an incremental system that allows additional energy source(s) to be added based on user demands. The energy management system 50 may be communicatively coupled (e.g., via a network) to the geothermal systems (e.g., 16A, 16B, and 16C), to other renewable energy generation systems (e.g. the solar power system 40), various loads and/or sensors in the buildings (e.g., buildings 12A, 12B, and 12C), and other components of the distributed energy resource system 51. The energy management system 50 may be used to provide system design and control for the distributed energy resource system 51.

In the illustrated embodiment, the energy management system 50 includes a design system 52. The design system 52 may design and/or enhance the design of a distributed energy resource system, which may be utilized for residences, commercial and industrial facilities, multi-building commercial and industrial sites, university campuses, schools, hospitals, municipalities, remote locations and islands, and the like. In some cases, the design system 52 may provide an enhanced design for an established distributed energy resource system, which may be undergoing certain changes (e.g., modifications). Additional details with regard to the design system 52 will be discussed below with reference to FIGS. 3 and 4.

In the illustrated embodiment, the energy management system 50 also includes a control system 54, which may provide control for the distributed energy resource system 51. For example, the control system 54 may be used to control renewable energy generation systems and/or loads to control the energy usage and reduce corresponding cost. Additional details with regard to the control system 54 will be discussed below with reference to FIGS. 5 and 6. While the energy management system 50 includes the design system 52 and the control system 54 in the illustrated embodiment, in other embodiments, the design system or the control system may be omitted.

The energy management system 50 may also include a database 55. The database 55 may be used to store data that is provided to the design system 52 and the control system 54, data output from the design system 52 and the control system 54, and other suitable data (e.g., historical design data for distributed energy resource systems similar to the distributed energy resource system currently under design, historical operation/control data for the distributed energy resource system currently in operation, other historical data, such as energy price data, local weather history data, local geophysical/geographic history data, etc.).

In addition to the design system 52, the control system 54, and the database 55, the energy management system 50 may include other suitable components, such as a user interface, a network interface, memory and storage, etc. Additional details with regard to the energy management system 50 will be discussed below with reference to FIG. 2.

Figure 2:
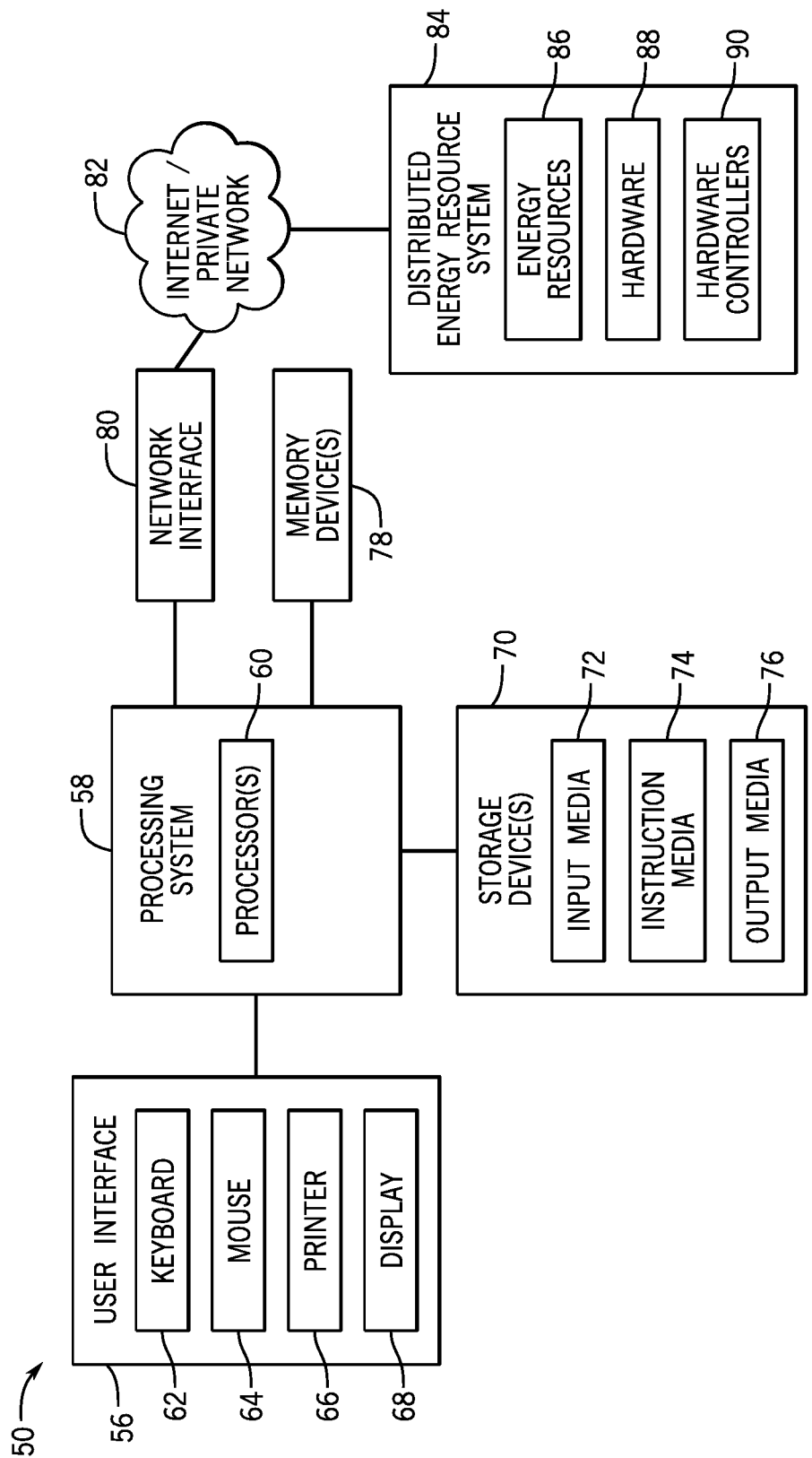
FIG. 2 is a block diagram of the energy management system of FIG. 1.

FIG. 2 is a block diagram of the energy management system 50 of FIG. 1. As illustrated, the energy management system 50 includes a user interface 56 and a processing system 58. In certain embodiments, the processing system 58 is configured to design and/or control a distributed energy resource system. In the illustrated embodiment, the processing system 58 includes one or more processors 60, which may be used to execute software to design and/or control the distributed energy resource system, such as design software, operational control software, and so forth. Moreover, the processor(s) 60 may include one or more microprocessors, such as one or more "general-purpose" microprocessors, one or more special-purpose microprocessors and/or application specific integrated circuits (ASICS), or some combination thereof. For example, the processor(s) 60 may include one or more reduced instruction set (RISC) processors.

As illustrated, the user interface 56 of the energy management system 50 includes multiple devices configured to enable an operator to provide input and receive output from the processing system 58. In the illustrated embodiment, the user interface 56 includes a keyboard 62 and a mouse 64 for inputting data, making selections, operating the energy management system 50, or a combination thereof. Furthermore, the user interface 56 includes a printer 66 for printing data, such as for printing a top-level design based on user-input objectives, a bottom-level detailed design of individual energy resources (e.g., energy sub-systems), or a combination thereof. The user interface 56 also includes a display 68 configured to present visual data to an operator, such as data corresponding to set-points of various distributed energy resources and/or loads to facilitate energy management. In certain embodiments, the display 68 may include a touchscreen configured to enable the operator to input data. While the illustrated embodiment includes a keyboard 62, a mouse 64, a printer 66, and a display 68, in alternative embodiments, the user interface 56 may include more or fewer input and/or output devices.

In the illustrated embodiment, the energy management system 50 includes storage device(s) 70 (e.g., non-transitory storage media), such as read-only memory (ROM), flash memory, a hard drive, or any other suitable optical, magnetic, or solid-state storage medium, or a combination thereof. The storage device(s) 70 may store the database 55 described previously. The storage device(s) 70 may store data (e.g., input data, output data, etc.), instructions (e.g., software or firmware for designing and/or controlling the distributed energy resource system), and any other suitable data. For example, in the illustrated embodiment, the storage device(s) 70 include input media 72, instruction media 74, and output media 76. The input media 72 may store data indicative of initial user-input objectives at the top-level, data indicative of initial detailed design of individual energy resources at the bottom-level, data indicative of initial set-points of the various distributed energy resources or loads, data received from various sensors monitoring the various distributed energy resources and/or loads, other suitable data, or a combination thereof. In addition, the instruction media 74 may store data indicative of instructions for determining adjusted set-points of the various distributed energy resources and/or loads, among other data. The output media 76 may store data indicative of the top-level design, data indicative of the bottom-level detailed design of individual energy resources, data indicative of the adjusted set-points of the various distributed energy resources and/or loads, other suitable data, or a combination thereof. While the illustrated storage device(s) 70 include input media, instruction media, and output media, in certain embodiments, these media may be combined into one or two media, or separated into additional media (e.g., media for each input, media for each output, etc.). Furthermore, the storage device(s) 70 may include additional media and/or at least one illustrated media may be omitted in alternative embodiments.

In the illustrated embodiment, the energy management system 50 includes memory device(s) 78 having volatile memory, such as random access memory (RAM), and/or nonvolatile memory, such as ROM. The memory device(s) 78 may store a variety of information and may be used for various purposes. For example, the memory device(s) 78 may store processor-executable instructions (e.g., firmware or software) for the processing system 58 to execute, such as instructions for designing and/or controlling the distributed energy resource system.

Furthermore, in the illustrated embodiment, the energy management system 50 includes a network interface 80 configured to establish a data connection between the processing system 58 and a private network (e.g., an enterprise network) or the internet 82. The network interface 80 may utilize a variety of communication protocol, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof. In certain embodiments, the network interface 80 may be configured to receive input data from a remote processing system, and/or the network interface 80 may be configured to send output data to the remote processing system. For example, the network interface 80 may be configured to receive data indicative of an initial top-level design based on user-input objectives, data indicative of an initial bottom-level detailed design of individual energy resources, data indicative of initial set-points of the various distributed energy resources and/or loads, data received from various sensors monitoring the various distributed energy resources and/or loads, other suitable data, or a combination thereof. In addition, the network interface 80 may be configured to send output data indicative of a determined top-level design based on user-input objectives, data indicative of a determined bottom-level detailed design of individual energy resources, data indicative of the adjusted set-points of the various distributed energy resources and/or loads, among other data.

For example, in the illustrated embodiment, the network interface 80 is configured to output data to a distributed energy resource system 84 via the private network or the internet 82. The distributed energy resource system 84 may include a variety of energy sources 86, such as electrical grid power, geothermal power, solar power (e.g., the solar power system disclosed above with reference to FIG. 1), wind power, small-scale hydroelectric power, biomass power, biogas power, or a combination thereof. In the illustrated embodiment, the distributed energy resource system 84 also includes hardware 88 and hardware controllers 90. The hardware 88 may include various loads (e.g., air conditioners, fans, boilers, burners, pumps, etc.), sensors (e.g., temperature sensors), energy storage elements (e.g., fuel cells, batteries, capacitors, flywheels, compressed air, pumped water, super magnets, hydrogen, etc.), and so forth. The hardware controllers 90 may include various corresponding controllers configured to control operations of the hardware 88. For example, the hardware controllers 90 may include air conditioner controllers to adjust the operation of the air conditioners to control a temperature within a building.

In the illustrated embodiment, the processing system 58 is configured to enhance system design and control of the distributed energy resource system 84. In such embodiment, the processor(s) 60 are configured to receive design input data and determine a top-level design by reducing a first object function based on the design input data and input data from bottom-level designers. The processor(s) 60 are also configured to output constraints to the bottom-level designers and receive requests for plug-in from energy sub-system via an interface. In addition, the processor(s) 60 are configured to receive initial guesses and design result from the bottom-level designers for iterative refinements to the top-level design and output design output data via the interface. In certain embodiments, after the distributed energy resource system is deployed in a target location and in operation, the processor(s) 60 are configured to receive input data for long-term operational control via a top-level primary controller; determine a long-term operational schedule by reducing a second object function based on the input data, in which one or more near-term portions of the long-term operational schedule are utilized to generate constraints; output the constraints to multiple secondary controllers; receive, via the primary controller, system states from the plurality of secondary controllers; monitor, via the primary controller and the plurality of secondary controllers, a compliance of the system states to requirements, in which a dynamic predictive model of the distributed energy resource system is used to simulate plausible scenarios to monitor the compliance, in which the requirements include system-related or business-related constraints; detect a divergence based on monitoring the compliance of the system states; in response to detecting the divergence, triggering the primary controller to re-plan or update the long-term operational schedule; send one or more updated near-term portions (e.g., new daily or short-term portions) of the updated long-term operational schedule to the plurality of secondary controllers to adjust the daily or short-term operations of the distributed energy resource system; and adjusting, via multiple tertiary controllers, operation of hardware to control operation of the distributed energy resource system based on the one or more updated near-term portions of the updated long-term operational schedule.

Design of a Distributed Energy Resource System

As previously discussed, the energy management system 50 may include the design system 52 configured to provide a design and/or enhance a design of a distributed energy resource system (e.g., including systems utilized for residences, commercial and industrial facilities, multi-building commercial and industrial sites, university campuses, schools, hospitals, municipalities, remote locations and islands, etc.). In certain embodiments, the design system 52 may provide an enhanced design for an established distributed energy resource system. For example, the established distributed energy resource system may be undergoing modifications, such as adding/removing a solar power system or a solar panel, adding/removing a wind power system, adding/removing one or more energy storage elements, and the like. Accordingly, the design system is configured to provide a design for a distributed energy resource system to be developed and to enhance a design for an established distributed energy resource system in response to certain changes in the established distributed energy resource system.

Figure 3:
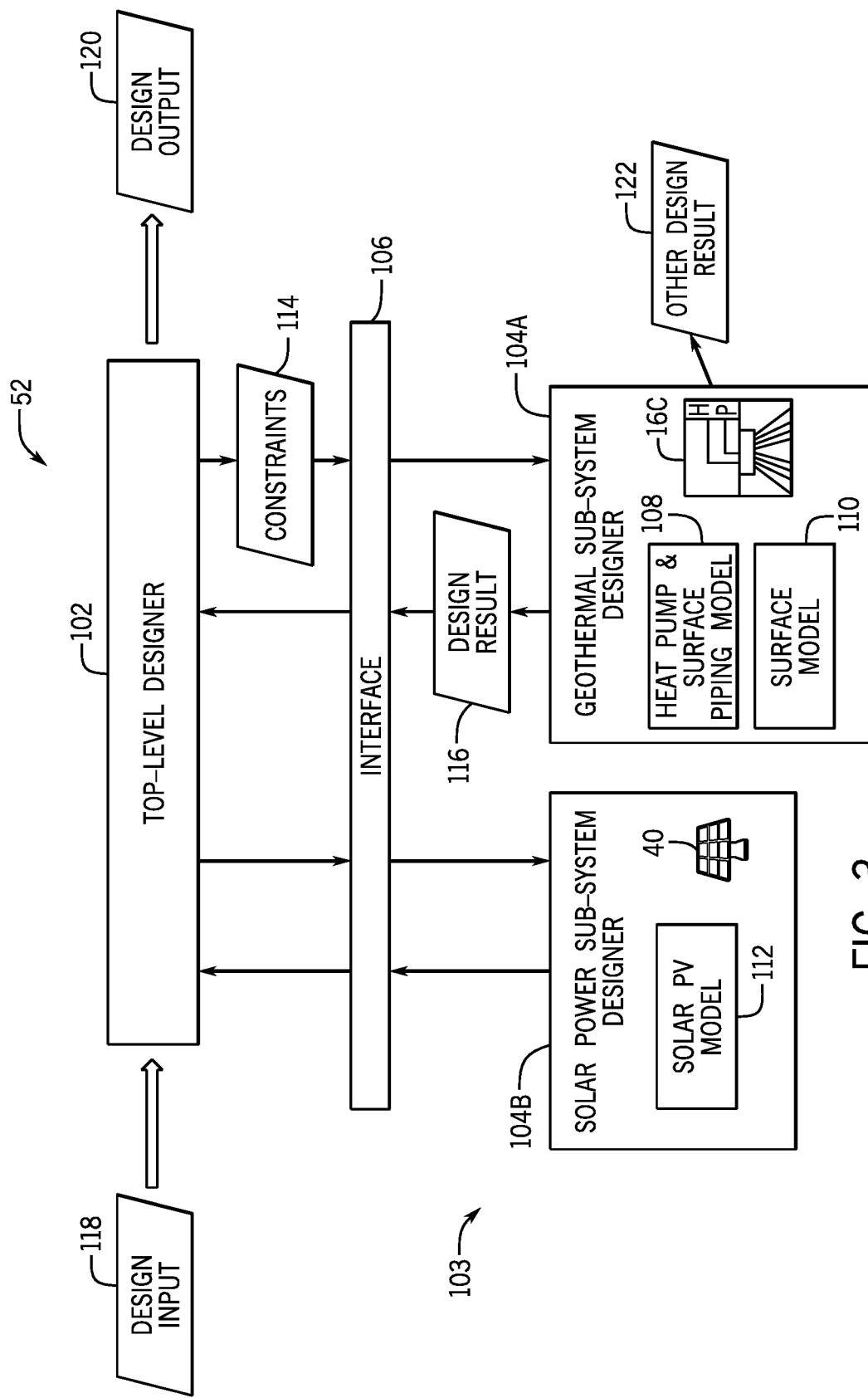
FIG. 3 is a block diagram of an example architecture of the design system of FIG. 1.

With the foregoing in mind, FIG. 3 is a block diagram of an example architecture of the design system 52 of FIG. 1. The design system 52 may provide designs of a distributed energy resource system at two levels: a top-level design based on user-input objectives, and a bottom-level detailed design of individual energy resources (e.g., energy sub-systems). The user-input objectives may include various energy usage related objectives, including but not limited to the project capital investment, project payback time, energy system operating costs, energy system carbon intensity, other suitable objects, or a combination thereof.

In the illustrated embodiment, the design system 52 includes a top-level designer 102, and the top-level design 102 is configured to generate the top-level design based on user-input objectives and other input data. The design system 52 also includes bottom-level designers 103, such as a geothermal sub-system designer 104A configured to generate a detailed design of the geothermal system 16A, and a solar power sub-system designer 104B configured to generate a detailed design of the solar power system 40. The top-level designer 102 and the bottom-level designers 103 may include optimizers that utilize a variety of models, including but not limited to simulation model(s), optimization model(s), predictive model(s), forecast model(s), any other suitable model(s), or a combination thereof. For example, the geothermal sub-system designer 104A may include a heat pump and surface piping model 108 and a surface model 110, and the solar power sub-system designer 104B may include a solar photovoltaic (PV) model 112. Such models may be evergreen models that are continuously/substantially open and run with capabilities of accepting various changes to the distributed energy resource system. The top-level designer 102 and the bottom-level designers 103 may include forecast models configured to forecast energy consumption of a target deployment location, where the distributed energy resource system will be deployed (e.g., at the aggregated location level, facility level, appliance level, piping level, etc.). In certain embodiments, the forecast models are configured to forecast energy price, energy demand, energy generation, environmental factors, energy storage capacity, other suitable factors associated with the distributed energy resource system, or a combination thereof.

The top-level designer 102 may automatically coordinate the bottom-level designers 103 for individual energy resources to seek a global target for the distributed energy resource system. In certain embodiments, the top-level designer 102 may be agnostic to the bottom-level designers 103, provided the interface 106 between the top-level designer 102 and the bottom-level designers 103 is respected.

The top-level designer 102 may receive design input 118 for the optimizer(s) (e.g., which use variety of models). The optimizer(s) may generate a design output 120, including the top-level design based on user-input objectives for the distributed energy resource system. The design input 118 may include a variety of inputs, including but not limited to power grid stability constraints, thermal comfort levels, energy price forecasts with uncertainties, energy demand forecasts with uncertainties (e.g., based on building usage, occupancy, weather, etc.), building energy models, energy generation forecasts with uncertainties, solar photovoltaic (PV) models, subsurface models, other suitable inputs, or combinations thereof. The design output 120 may also include a variety of design targets, including but not limited to project capital investment or capital expense ($CAPEX_{project}$), project payback time, distributed energy resource system operating cost or operating expense (OPEX), energy savings, distributed energy resources system operating cost related to maintenance ($OPEX_{maintenance}$), distributed energy resource system carbon intensity ($CO_2$ intensity), carbon footprint savings, or combinations thereof. For example, as previously discussed, the energy management system 50 may include multiple devices (e.g., the user interface) configured to enable a user to provide input (e.g., as part of the design input 118) to and receive output (e.g., as part of the design output 120) from the processing system. Such input and output may be stored in the storage device(s) using the input media and the output media.

The bottom-level designers 103 (e.g., the geothermal sub-system designer 104A, the solar power sub-system designer 104B) are configured to generate bottom-level detailed designs of the individual energy resources (e.g., energy sub-systems including geothermal systems, solar power systems, wind power system, etc.). In some embodiments, certain functionalities of the bottom-level detailed design may be provided by one or more external design models or software, provided an interface 106 between the top-level designer 102 and the bottom-level designers 103 is respected. In some embodiments, the energy consumption (e.g., forecasted energy consumption of the target deployment location) may be provided by one or more external design models or software, provided an interface 106 between the top-level designer 102 and the bottom-level designers 103 is respected.

The design system 52 may use a hierarchical optimization approach for the design of the distributed energy resource system. The hierarchical optimization approach may include two levels: the top-level designer 102 (e.g., aggregator) configured to generate a design for the whole energy system, and one or more bottom-level designers 103 (e.g., the geothermal sub-system designer 104A and the solar power sub-system designer 104B) that are separated from each other and are configured to generate the detailed designs of the local energy sub-systems. The top-level designer seeks to optimize the user-input objectives for the whole energy system, such as the project economics and operational carbon intensity, including taking into account energy limits and other constraints from the local energy sub-systems. Each bottom-level designer seeks to optimize detailed engineering designs of a corresponding energy sub-system, such as a geothermal sub-system (e.g., the geothermal system 16A) and a solar power sub-system (e.g., the solar power system 40).

To coordinate with each other, the bottom-level designers 103 may interface, via the interface 106, with the top-level designer 102. The interface 106 between the top-level designer and the bottom-level designers 103 may be configured to pass through constraints 114 from the top-level designer 102, and physical parameters, such as design result 116, from the bottom-level designers 103. In certain embodiments, the bottom-level designers 103 may receive the constraints 114 from the top-level designer 102. The constraints 114 may include a minimum energy output, a maximum cost, a maximum energy consumption, other suitable parameters defined by another sub-system designer, or a combination thereof. For example, a fluid temperature resulting from a sub-system designer of a solar thermal generation sub-system may be sent to the top-level designer 102 via the interface 106. If the fluid temperature satisfies the demand of the target deployment location, the fluid temperature may be sent to a sub-system designer of a ground source heat pump sub-system as a constraint. In certain embodiments, the bottom-level designers may send the design result 116, including detailed parameters, to the top-level designer 102. The parameters may include actual $CAPEX_{project}$, actual energy consumptions, actual energy generated, a variety physical parameters, other suitable parameters, or combinations thereof. In some embodiments, certain bottom-level designers (e.g., the geothermal sub-system designer 104A) may create other design result(s) 122 that may not be sent to the top-level designer 102. For example, the other design result(s) 122 may include geothermal well designs, heat pump and/or piping designs, etc. The other design result(s) 122 may be used by field engineers working at the target deployment location.

The two levels, including the top-level designer 102 and the bottom-level designers 103, may communicate and iterate during an optimization process until a convergence or a satisfactory objective value is reached. The two-level design provides an intelligent top-level aggregator designer that coordinates the decentralized bottom-level designers (e.g., the bottom-level designers for individual energy resources) to seek a global target for the designed energy system that satisfies the energy demand of the target deployment location within a confidence level. In certain embodiments, the two-level design may provide characterizations of energy consumptions of the target deployment location at an aggregated location level, facility levels, appliance levels, piping levels, and so forth.

The two-level design architecture described herein enables the design system 52 to perform a design process more efficiently than other design systems having different design architectures. For example, using the design system 52, the design process may be split into a top-level design process and multiple bottom-level design processes. The bottom-level designers 103 may perform respective bottom-level design processes independently from each other and in parallel. As such, the design system 52 may execute the design process with reduced turnaround time and/or reduced computing power, in comparison to other design systems that may execute individual design processes (e.g., for sub-system designs) sequentially.

In certain embodiments, the design system 52 may be trained (e.g., via machine learning) to improve the design at both the top-level and the bottom level. For example, training data, such as the historical design data for distributed energy resource systems similar to the distributed energy resource system currently under design and/or other historical data, such as energy price data, local weather history data, local geophysical/geographic history data, etc., may be used as input data to train the design system 52 using machine learning algorithms. After training with the machine learning, the design system 52 may have improved design parameter(s) and/or model(s) (e.g., simulation model, optimization model, predictive model, forecast model, etc.). The machine learning algorithms may be implemented using machine learning circuitry or software that may access the historical design data and other historical data stored in the database 55. Depending on the inferences, the machine learning circuitry or software may implement different forms of machine learning. In some embodiments, a supervised machine learning may be implemented. In some embodiments, an unsupervised machine learning may be implemented. As used herein, machine learning may refer to algorithms and statistical models that the design system uses to perform a specific task with or without using explicit instructions. For example, a machine learning process may generate a mathematical model (e.g., simulation model, optimization model, predictive model, forecast model, building energy model, solar photovoltaic (PV) model, subsurface model, etc.) based on a sample of the clean data, known as "training data," in order to make predictions or decisions without being explicitly programmed to perform the task.

As previously discussed, the distributed energy resource system designed by the design system may be utilized for residences, commercial and industrial facilities, multi-building commercial and industrial sites, university campuses, schools, hospitals, municipalities, remote locations and islands, etc. The two-level design may be used to provide designs for multiple future configurations of a distributed energy resource system, for example, with added or removed energy resources or loads, in order to accommodate an incremental system such as that encountered in a site/campus development project. Further details with regard to the two-level design will be discussed below with reference to FIG. 4.

It should be noted that the components described above with regard to the architecture of the design system 52 are exemplary components, and the design system 52 may include additional or fewer components as shown.

In an embodiment, the design system 52 is used to provide enhanced designs for a distributed energy resource system that includes multiple solar power sub-systems utilized in a university campus. The top-level designer 102 receives an initial design, which includes an amount of solar photovoltaic (PV) panels utilized in the university campus. The top-level designer 102 may also receive user-input objectives (e.g., project capital investment, project payback time, energy system operating costs, energy system carbon intensity, etc.) and other design inputs, such as energy price forecasts, solar photovoltaic PV models, local weather history data, etc. Furthermore, the top-level designer 102 receives new design input such as long timescale (e.g., over decades) local weather forecasts based on certain climate forecast model(s). Based on the new design input, the top-level designer 102 redesigns the distributed energy resource system and generates updated constraints (e.g., updated minimum energy output from solar power systems, updated maximum energy consumption, etc.), which are passed through the interface to the bottom-level designers 103 (e.g., solar power sub-system designers). Accordingly, the bottom-level designers 103 recreate detailed designs (e.g., solar power sub-system energy generation based on the long timescale local weather forecasts), which are passed through the interface back to the top-level designer 102. The top-level designer 102 utilizes received detailed designs to update the design at the top level, including an updated amount of solar PV panels utilized in the university campus. The optimization process may include multiple iterations until a convergence or a satisfactory objective value is reached. Furthermore, one or more heat pump sub-systems may be added into the distributed energy resource. The top-level designer may update the design at the top level to balance the detailed designs between the solar power sub-systems and the thermal pump sub-systems. For example, the amount of solar PV panels and/or the amount of heat pumps or heat exchangers may be updated.

Figure 4:
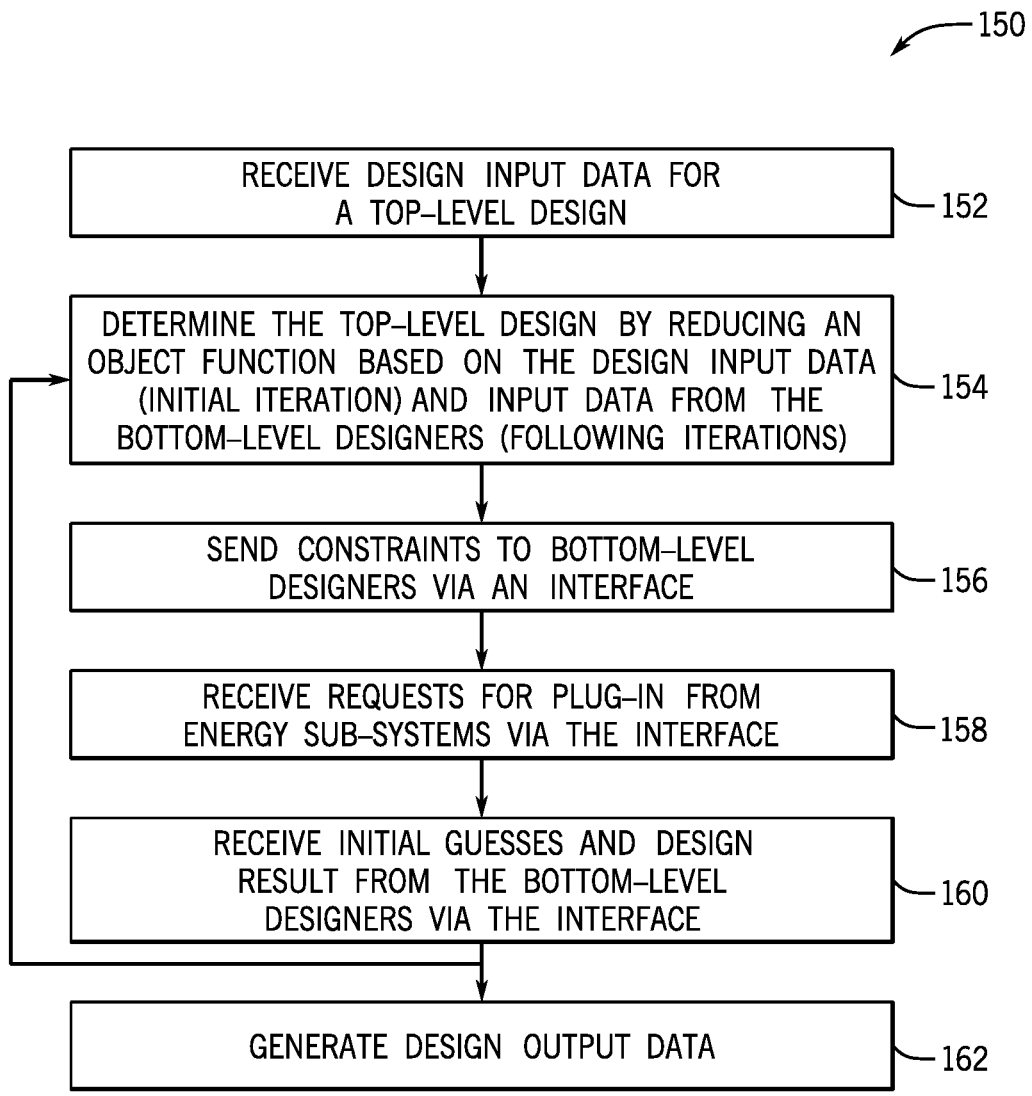
FIG. 4 is a flow diagram of an example method for design of the distributed energy resource system using the design system of FIG. 3.

FIG. 4 is a flow diagram of an example method 150 for design of a distributed energy resource system using the design system of FIG. 3. Although the example method 150 described in FIG. 4 is described in a particular order, the example method 150 may be performed in any suitable order and is not limited to the order presented herein. Although each processing block is described below in the method as being performed by the design system, other suitable computing system(s) may perform a least one of the method steps described herein.

At process block 152, the top-level designer may receive design input data for a top-level design. The design input data may include power grid stability constraints, thermal comfort levels, energy price forecasts with uncertainties, energy demand forecasts with uncertainties (e.g., based on building usage, occupancy, weather, etc.), building energy models, energy generation forecasts with uncertainties, solar photovoltaic (PV) models, subsurface models, surface footprint limits, capital investment or capital expense (CAPEX) limits, or combinations thereof. In certain embodiments, user preferences and utility operator constraints may be used as inputs to the top-level designer.

In certain embodiments, certain external inputs may be used by the top-level designer, including results from one or more forecast models (e.g., fossil fuel energy price forecast model, climate change forecast model, etc.). Such results may include forecasted energy consumption, forecasted energy generation potential, forecasted energy prices, energy demand, energy generation, environmental factors, energy storage capacities, and so forth. Such results may be accompanied by corresponding uncertainties. Uncertainties (marked as 6) may be significant characteristics of top-level design for certain decision and intermediate variables. The two-level design architecture described herein provides a robust optimization approach to frame uncertainty problems. For the top-level design, long-scale periods, such as one year, may be given for the external inputs.

At process block 154, the top-level designer may determine the top-level design by reducing (e.g., minimizing) an object function based on the design input data (initial iteration) and input data from the bottom-level designers (following iterations). For the initial iteration, the top-level designer may not receive input data from the bottom-level designers and may reduce (e.g., minimize) the object function based on the design input data. The objection function, $Z(CAPEX_{project}, OPEX, OPEX_{maintenance}, CO_2$ intensity, $PERCENT_{renewables})$, where the $PERCENT_{renewables}$ is the percentage of renewable energy used, may be a multi-objective function to be reduced (e.g., minimized) by the top-level designer. The design system may offer multiple future scenarios that meet a range of target objectives, and the user may select 'mode type' goals. In certain embodiments, the multi-objective may be tailored to client requests, such as temperature over decades, extreme events, etc. The multi-objective may include any or all of the listed design targets (e.g., capital investment, operating expense, operating cost related to maintenance, $CO_2$ intensity, project payback time, energy savings, carbon footprint savings, etc.), other suitable targets, or a combination thereof.

When it is solved (in the initial iteration), the top-level designer may provide a variety of constraints for the bottom-level designers. The constraints may include a minimum energy output requirement for each energy sub-system, budgetary constraint(s) (e.g., a maximum cost $CAPEX_{max}$, a maximum energy consumption/usage, etc.), any other suitable parameters (e.g., heat transfer fluid temperature, heat capacity of ground for thermal storage, etc.), or a combination thereof. Accordingly, top-level decision variables, such as the minimum energy output requirement for each energy sub-system and budgetary constraint(s) may be the constraints for the bottom-level designers. In certain embodiments, some of the top decision variables and constraints are time-based vectors (spanning the project life or another suitable horizon). An interface between the top-level designer and the bottom-level designers is configured to support such dimensionality.

At process block 156, the top-level designer may send the constraints to one or more bottom-level designers (e.g., the geothermal sub-system designer and/or the solar power sub-system designer) via an interface. Based on the received constraints, each bottom-level designer is configured to generate a corresponding local detailed design of a corresponding energy sub-system, seeking to enhance (e.g., maximize) certain target objectives (e.g., the net energy output, the geothermal power percentage, the solar power percentage, etc.) while meeting the constraints (e.g., CAPEX, energy consumption, minimum energy output, etc.) provided by the top-level designer, as well as specific technical constraints for that local sub-system, such as fluid temperature limits in the geothermal well in the case of ground-source heat pump sub-systems.

In certain embodiments, certain external inputs may be used for local design processes, including results from local forecast models. Such results may include forecasted energy consumption, forecasted energy generation potential, forecasted energy prices, energy demands, historical energy generation, environmental factors, energy storage capacities, and so forth. Such results may be accompanied by corresponding uncertainties. For the bottom-level designers, short timescale periods, such as one day, may be provided for the external inputs.

A local design for each energy sub-system may be determined separately and incrementally. Each bottom-level designer associated with a corresponding energy sub-system may have a system model, including an approximate relation of how the CAPEX and OPEX (from energy usage, maintenance, and others) of the energy sub-system relate to generated energy profiles (e.g., energy generation and consumption). The system model may also include a detailed relation between design parameters "x" and the design results (e.g., CAPEX, energy generation, consumption profiles with uncertainties, etc.).

In the cases in which the local design converges, the solution $x^*(CAPEX_i, E_i^{out}, E_i^{in})$, where $E_i^{out}$ is a minimum/maximum energy generation of iteration "i", and $E_i^{in}$ is a minimum/maximum energy consumption of iteration "i", is passed as an initial guess for an iterative refinement to the top-level design optimization via the interface.

In the cases in which the local design does not converge, the bottom-level designer may inform the top-level designer about how to improve the initial guess of the design parameters $x(CAPEX_i, E_i^{in})$. In some embodiments, determining a certain form of a gradient or a heuristic may be used. In some embodiments, the historical data may be used. Such historical data may be stored in the database 55.

In certain embodiments, the interface may be configured to support passing the pertinent parameters resulting from one of the bottom-level designer to one or more of the other bottom-level designer.

In certain embodiments, the budget and energy output constraints passed by the top-level designer may be used directly in a system model of a bottom-level designer. In some cases, a pre-processing step that translates these constraints into direct constraints (e.g., on the design parameters "x") may facilitate the local design process.

At process block 158, the top-level designer may receive requests for plug-in, via the interface, from one or more energy sub-systems (e.g., geothermal system, solar power system, wind power system, etc.) associated with the one or more bottom-level designers. As used herein, the plug-in may refer to a component (e.g. a bottom-level designer) attempting to add specific features (e.g., detailed design features) to an existing system (e.g., the top-level designer). The requests for plug-in may enable one or more bottom-level designers of the one or more energy sub-systems to send certain design information to the top-level designer, if the requests for plug-in are granted by the top-level designer.

In response to accepting the requests for plug-in from the one or more energy sub-systems, at process block 160, the top-level designer may receive initial guesses (e.g., an initial guess of the design parameters $x(CAPEX_i, E_i^{out}, E_i^{in})$, a gradient or heuristic, or some historical data stored in the database) and the design result (e.g., the solution $x^*(CAPEX_i, E_i^{out}, E_i^{in})$) from the bottom-level designers via the interface. The received initial guesses and the design result may be sent back to the process block 154 for iterative refinements to the top-level design.

At process block 162, the design system may generate design out data. The top-level designer may generate a global design for the distributed energy resource system, such as project capital investment or capital expense (CAPEX$_{project}$), project payback time, energy system operating cost or operating expense (OPEX), energy savings, energy system operating cost related to maintenance (OPEX$_{maintenance}$), energy system carbon intensity ($CO_2$ intensity), carbon footprint savings, or combinations thereof. The bottom-level designers may generate detailed designs for individual energy resources (e.g., energy sub-systems). For example, the geothermal sub-system designer may generate design parameters for the heat pump system(s) in a target location, such as number of heat exchangers to be deployed, depths of the heat exchanges to be disposed within respective wellbores/boreholes within the ground, number of inlet and outlet conduits to be deployed, and so forth. For example, the solar power sub-system designer may generate design parameters for the solar power systems in the target location, such as number or solar photovoltaic (PV) panels to be deployed, positions (e.g., on top of buildings or on the ground) and/or orientations (e.g., being able to track the sun or not) of the PV panels, and so forth. The design system may present the design result listed above to one or more users via the user interface (e.g., using the printer or the display). The one or more users may determine the performance of the designed distributed energy system based on the design result. The design result of the design system may facilitate a construction of the ultimately designed distributed energy resource system at the target location.

The top-level designer and the bottom-level designers may be implemented in a single computing device (e.g., a server, a desktop computer, a laptop, a tablet, etc.), or the bottom-level designers may be implemented in different computing device(s) (e.g., a different computing device for each bottom-level designer, a different computing device from the top-level designer, etc.) as external simulator(s) located elsewhere (e.g., on a cloud).

Operation of a Distributed Energy Resource System

After a distributed energy resource system is designed and deployed (e.g., either by the design system or another system) in a target location (e.g., residences, commercial and industrial facilities, multi-building commercial and industrial sites, university campuses, schools, hospitals, municipalities, remote locations and islands, and the like), the energy management system 50 may be used to provide system control for the distributed energy resource system to improve energy efficiency (e.g., reducing certain energy consumption, increasing renewable energy usage, reducing maintenance cost, etc.). The energy management system may use a hierarchical optimization-based control system (e.g., the controllers), in which short-term controllers control and enhance the daily orchestration of the distributed energy resource system and are overlaid by a long-term adaptive planning system (e.g., a long-term controller), which is configured to determine a long-term operational schedule based on long-term constraints and future events (e.g., anticipated hardware maintenance actions) at a top-level. The value of the hierarchical optimization-based control system is that the long-term controller may use a simplified description of the distributed energy resource system to generate longer-term solutions (e.g., a top-level plan or schedule), and then pass a near-term portion of the long-term operational schedule, such as requirements for the day ahead, to the short-term controllers to be refined down to lower levels (e.g., set-point level) of the distributed energy resource system.

The energy management system may use the hierarchical optimization-based control system to automatically monitor compliance of future system states to requirements via a dynamic predictive model at the top-level (e.g., a first level) and a variety of dynamic predictive models at the lower-level (e.g., a second level, a third level, etc.) of the control system, and automatically trigger the long-term adaptive planning system at the top-level to re-plan a long-term operational schedule. The requirements may include any system-related and/or business-related constraints (e.g., capital investment, energy consumption, minimum energy output, etc.), which may vary from one implementation to another. The requirements may be associated with numerous implementation-specific decisions of a design project to be made to achieve the developers' specific goals. The dynamic predictive model at the top-level and the variety of dynamic predictive models at the lower-level may be constructed and repeatedly improved through an operational life of the distributed energy resource system. These models may be used by forecast models for energy demand, energy generation, and energy storage capacity, which provide constraints to the hierarchical optimization-based control system.

In some embodiments, one of the dynamic predictive models may include operation data (e.g., energy consumption) of the distributed energy resource system. The energy consumption of the target deployment location may be characterized from the operation data of energy producing resources in the distributed energy resource system. The energy management system may use the operation data to repeatedly improve the dynamic predictive model of the energy consumption of the target deployment location. In certain embodiments, the energy management system may use micro-testing to construct and repeatedly improve the dynamic predictive models of distributed energy resources such as the energy sub-systems (e.g., geothermal system(s), solar power system(s), wind power system(s), etc.).

Figure 5:
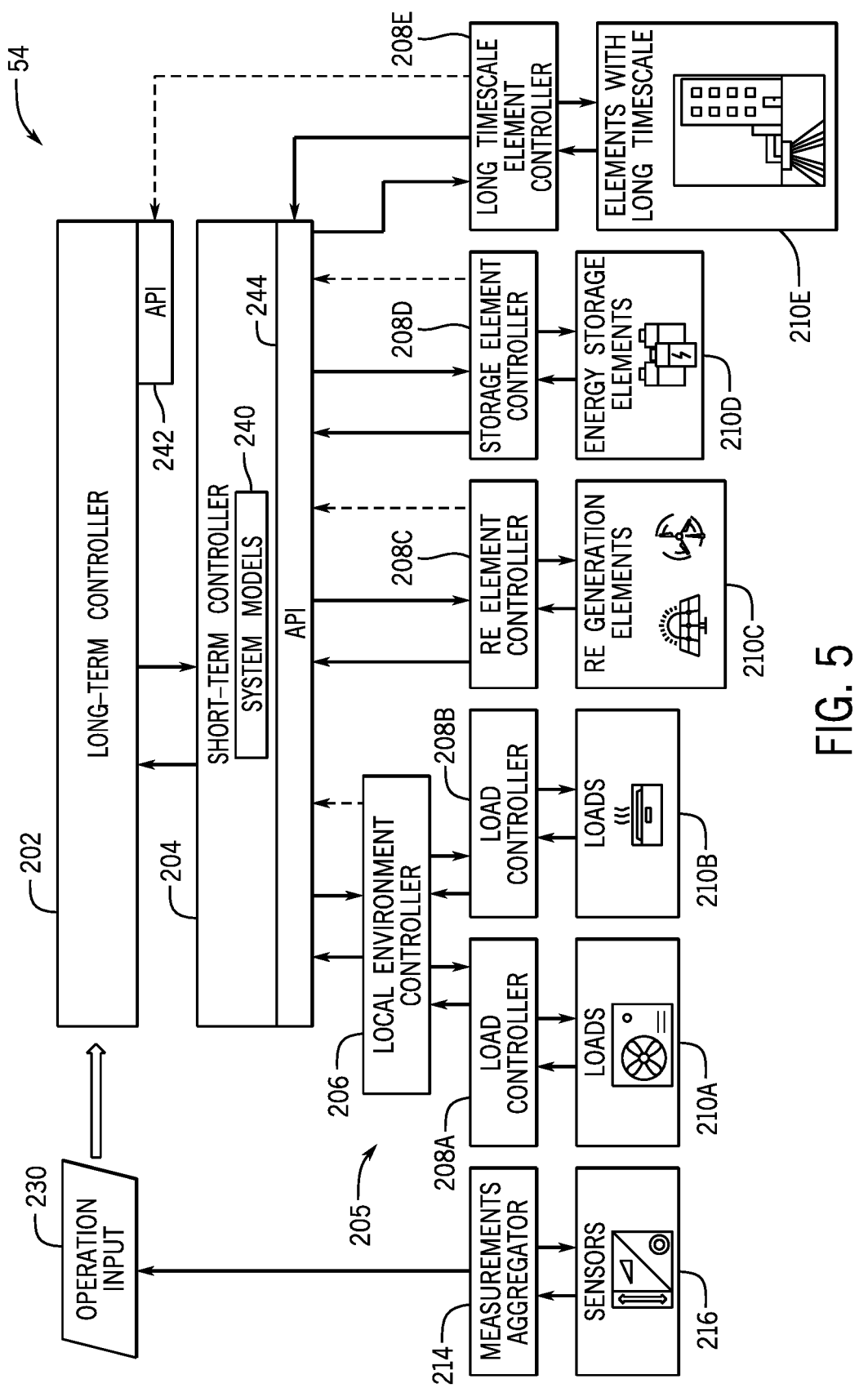
FIG. 5 is a block diagram of an example architecture of the control system of FIG. 1.

Bearing this in mind, FIG. 5 is a block diagram of an example architecture of the control system 54 of FIG. 1. The control system 54 may provide enhanced control for a distributed energy resource system during operation. For instance, the control system 54 may be used to control renewable energy generation systems and/or loads to improve the energy efficiency and reduce corresponding cost. The control system 54 may include control hardware (e.g., controllers) at two or more levels. In the illustrated embodiment, the control system 54 includes a long-term controller 202, one or more short-term controllers 204, and a variety of local controllers, including a local environment controller 206, a load controller 208A communicatively connected to loads 210A (e.g., air conditioners), a load controller 208B communicatively connected to loads 210B (e.g., electrical heaters), a renewable energy generation element controller 208C communicatively connected to renewable energy generation elements 210C (e.g., solar power system, wind power system), an energy storage element controller 208D communicatively connected to energy storage elements 210D (e.g., fuel cells, batteries, capacitors, flywheels, compressed air, pumped hydro, super magnets, hydrogen, etc.), a long timescale element controller 208E communicatively connected to elements 210E with long timescale components (e.g., certain energy resources having long-term dynamics such that changes in their may lie outside of the prediction horizon of the short-term controller 204), a measurements aggregator 214 communicatively connected to a variety of sensors 216 (e.g., temperature sensors, moisture sensors, etc.), any suitable hardware that may be used by the distributed energy resource system, or a combination thereof.

The long-term controller 202 at a top level may be implemented as an automated dynamic planner, a constraint programming solver, a model-based predictive controller, or another time-based optimization program, which is capable of automatically re-planning the operations of the distributed energy resource system. The control system 54 may use the long-term controller 202 at the top level and the short-term controllers 204 at a second level, to control operations of a variety of local component controllers 205 (e.g., the load controllers 208A and 208B, the renewable energy generation element controller 208C, the energy storage element controller 208D) and the aggregators (e.g., the measurements aggregator 214). The planning horizon at the top level may be long-term, for example, 25 years, so that (i) the operation of the distributed energy resource system based on the long-term operational schedule satisfies system state constraints that take long time scales to manifest, such as the stability of the heat transfer with the ground in ground source heat pump systems, and (ii) the planning based on the long-term operational schedule anticipates future events, such as predictive maintenance of the distributed energy resource system equipment, anticipated changes in energy consumption behavior such as absence periods from the energy consumers or other users. The control system 54 determines an overall operational schedule that accounts for these future events.

The short-term controllers 204 at a second level may be implemented as model-based predictive controllers or other time-based control programs/routines. As the overall operational schedule is executed by the local component controllers 205, system models 240 of the short-term controllers 204, which are implemented as dynamic predictive models, are used for simulation of plausible scenarios in order to monitor the compliance of future states to requirements described above. If divergences are encountered, the energy management system may automatically trigger the long-term controller 202 to re-plan the long-term operational schedule. The updated long-term operational schedule may either be deployed automatically to the short-term controllers 204 at the second level or communicated to a human decision-maker for authorization.

The short-term controller 204 is configured to orchestrate energy generation, storage, conversion between power and heat, and controllable loads to achieve a match between supply and demand of power/energy for the whole day or short-term operation that reduces cost, increases profit, reduces carbon intensity, or a combination thereof. The hierarchical optimization-based control system enables the short-term controller 204 to receive constraints on certain operating parameters from the top-level plan (e.g., the long-term operational schedule). The short-term controllers 204 at the second level may operate as secondary controllers to control tertiary controllers, such as the local component controllers 205, which are performing set-point tracking for the individual energy resources.

Some of the individual energy resources, such as the elements 210E with long timescale, may have long-term dynamics such that changes in its state(s) may lie outside of the prediction horizon of the short-term controller 204. The stability of the heat transfer with a ground in a ground source heat pump system is one example. These long-term dynamics are described as a constant behavior (e.g., within a day range) to the short-term controller 204 and are controlled by the long-term controller 202.

The local component controllers 205 (e.g., the hardware controllers and/or aggregators) may be configured to execute set-point schedules based on one or more near-term portions of the long-term operational schedule for the individual energy resources. Each set-point schedule may include detailed set-points for operating a corresponding component (e.g., hardware, sensors, etc.) in an enhanced manner. In some embodiments, the renewable energy generation element controller 208C and the energy storage element controller 208D, may communicate with the short-term controllers 204 directly via an application programming interface (API). In some embodiments, the load controllers 208A and 208B, may communicate with the short-term controllers 204 through the local environment controller 206. The local hardware controllers 208A and 208B may control operations of the loads 210A and 210B to provide heat or cold of a building with certain coordination controlled by the local environmental controller 206 in a lower level (e.g. on-demand basis), by the short-term controllers 204 (e.g., daily basis), and by the long-term controller 202 (e.g., monthly or yearly basis).

Controller(s) at each level may receive inputs from the forecast models providing energy price, energy demand, energy generation, environmental factors, energy storage capacity, and so forth. The controller(s) at each level may also receive inputs of user preferences and/or of constraints from the utility operator. In the illustrated embodiment, the long-term controller 202 may receive operation input 230. The operation input 230 may include user-input and other inputs, such as power grid stability constraints, thermal comfort levels, energy price forecasts with uncertainties, energy demand forecasts with uncertainties (e.g., building usage, occupancy, weather, etc.), building energy models, energy generation forecasts with uncertainties, solar photovoltaic (PV) models, subsurface models, or a combination thereof.

In certain embodiments, the long-term controller 202 may include an application programming interface (API) 242 to control the data exchange between the long timescale element controller 208E and the long-term controller 202. The short-term controllers 204 may include an API 244 to control the data exchange between the short-term controllers 204 and the local component controllers 205. These APIs may facilitate applications (e.g., operation controls) at different levels by allowing two applications to communicate to each other more efficiently.

In certain embodiments, the dynamic predictive models, including the dynamic predictive model at the top-level and the variety of dynamic predictive models at the lower-level of the control system 54, as well as of the local hardware controllers of energy consuming elements at the target deployment location, may be updated on a regular basis (e.g., 1 day, 1 week, 1 month) with the operation data obtained by the energy management system. The updated models of the control system 54 may be generated on a regular basis and/or at the request of an end user to evaluate new incremental designs of the distributed energy resource system, for example, with added or removed energy resources or loads. The new incremental designs, when executed by the control system, may provide more accurate control of the distributed energy resource system.

In certain embodiments, the control system 54 may be trained, via machine learning, to improve operation/control at different levels. For example, training data, such as the historical operation/control data for the distributed energy resource system in operation and/or other historical data, such as energy price data, local weather history data, local geophysical/geographic history data, other suitable data, or a combination thereof, may be used as input data to train control system 54 using machine learning algorithms. Such machine learning algorithms may be implemented using machine learning circuitry or software that may access the historical operation/control data and/or other historical data stored in the database. Depending on the inferences to be made, the machine learning circuitry may implement different forms of machine learning. The machine learning circuitry or software may be the same circuitry or software used to train the design system described previously, or a different circuitry or software. In some embodiments, a supervised machine learning may be implemented. In some embodiments, an unsupervised machine learning may be implemented. As used herein, "machine learning" may refer to algorithms and statistical models that computer systems use to perform a specific task with or without using explicit instructions. For example, a machine learning process may generate a mathematical model (e.g., the dynamic predictive model at the top-level and/or the variety of dynamic predictive models at the lower-level of the control system 54) based on a sample of the clean data, known as "training data," in order to make predictions or decisions without being explicitly programmed to perform the task.

In certain embodiments, the dynamic predictive models may be constructed and/or improved by micro-testing individual energy resources (e.g., energy sub-systems including geothermal system(s), solar power system(s), wind power system(s), etc.). For example, a predictive model-based controller may create fluctuations in certain set-points to calibrate parameters of local (e.g., linear) models for each individual energy resource. A sequence of local domain models (e.g., within the short-term controllers 204) may be constructed throughout an operational use of the energy management system under a range of conditions, which may enable the long-term controller or the short-term controllers to rapidly adjust to operational conditions close to previous operational conditions of the distributed energy resource system. Such "local domain" models may be linear or more complex (e.g. non-linear) depending on additional information and physics on which they are based.

In certain embodiments, the energy management system may include state estimators to generate execution feedbacks to the long-term controller 202 and the short-term controller 204. The execution feedbacks may include energy flows, state of charge for storage system(s), state of health of equipment (e.g., local hardware), expected end-of-useful-life, performance degradation trend, and so forth.

As previously discussed, the distributed energy resource system in operation may be utilized in residences, commercial and industrial facilities, multi-building commercial and industrial sites, university campuses, schools, hospitals, municipalities, remote locations and islands, etc. The hierarchical optimization-based control system may be used to provide enhanced controls for operations of a dynamic distributed energy resource system (e.g., with added/removed energy resources or loads) to accommodate changes encountered in a site (e.g., a university campus) development project. Further details with regard to the hierarchical optimization-based control system will be discussed below with reference to FIG. 6.

It should be noted that the components described above with regard to the architecture of the control system 54 are exemplary components and the control system 54 may include additional or fewer components as shown.

Figure 6:
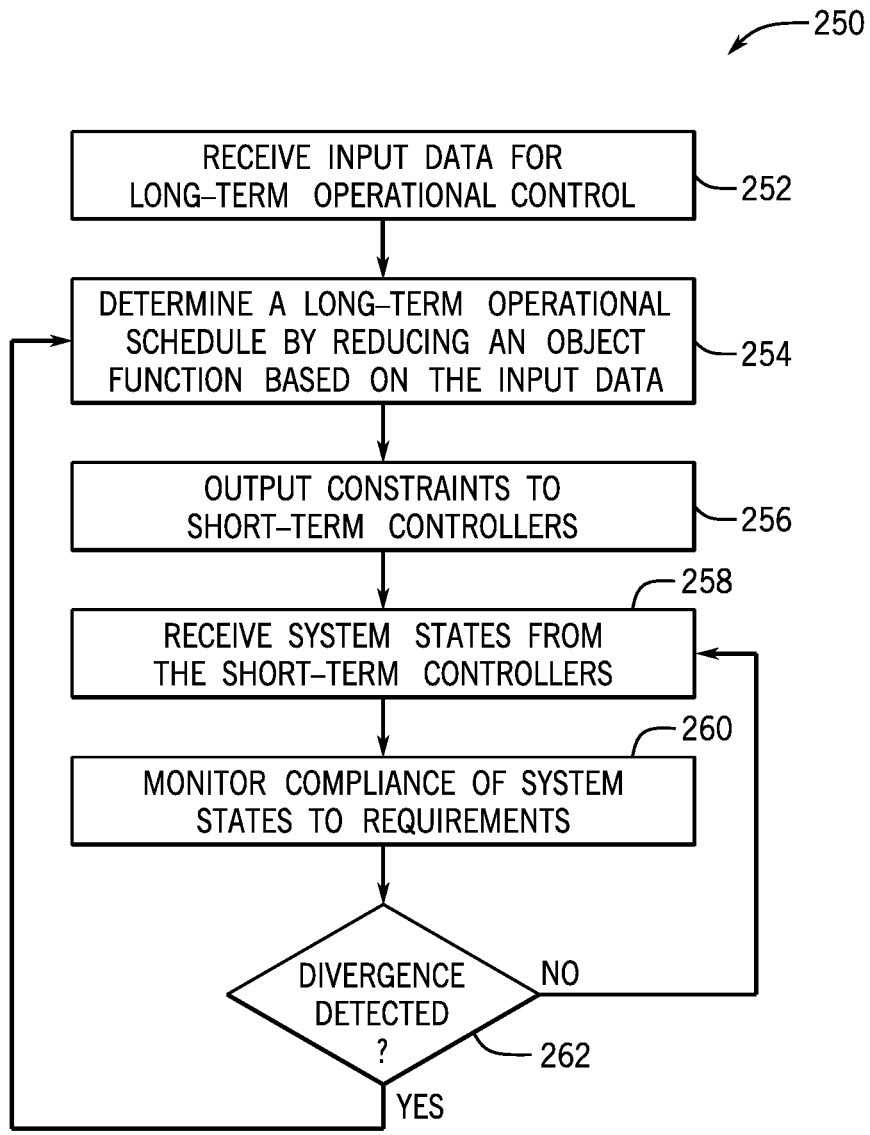
FIG. 6 is a flow diagram of an example method for control of the distributed energy resource system using the control system of FIG. 5.

FIG. 6 is a flow diagram of an example method for control of the distributed energy resource system using the control system of FIG. 5. Although the example method 250 described in FIG. 6 is described in a particular order, the example method 250 may be performed in any suitable order and is not limited to the order presented herein. Although each processing block is described below in the method as being performed by the control system, other suitable computing system(s) may perform a least one of the method steps described herein.

At process block 252, the long-term controller may receive input data for long-term operational control. The input data may include power grid stability constraints, thermal comfort levels, energy price forecasts with uncertainties, energy demand forecasts with uncertainties (e.g., building usage, occupancy, weather, etc.), building energy models, energy generation forecasts with uncertainties, solar photovoltaic (PV) models, subsurface models, or a combination thereof. In certain embodiments, the long-term controller may receive input data from the forecast models providing energy price, energy demand, energy generation, environmental factors, energy storage capacity, or a combination thereof. In certain embodiments, the long-term controller may receive input data related to user preferences and/or to constraints from a utility operator. In certain embodiments, the input data may include measurements from the measurements aggregator. Such measurements may be acquired by the sensors (e.g., temperature sensors measuring building temperature, etc.).

At process block 254, the long-term controller may determine a long-term operational schedule by reducing (e.g., minimizing) an object function based on the input data. The object function may include operation metrics, such as cost, profit, carbon intensity, any suitable metric, or a combination thereof. For example, the long-term operational control may include reducing the cost, increasing the profit, reducing carbon intensity, or a combination thereof. Certain operation metrics may be used as constraints for the short-term controllers. The long-term controller may use a simplified description of the distributed energy resource system to generate longer-term solutions (e.g., a top-level plan or schedule), and then pass a near-term portion of a top-level plan or schedule to the short-term controllers.

At process block 256, the long-term controller may output constraints to short-term controllers. As mentioned above, the constraints may include the one or more near-term portions of the top-level plan or schedule (e.g., the long-term operational schedule), such as requirements for the day ahead (e.g., daily power constraints, daily heat flow constraints, etc.), to the short-term controllers to be refined down to a level of set-points of the distributed energy resources and/or loads The short-term controllers may perform day-ahead plans/executions and/or intra-day plans/executions. For example, the short-term controllers may orchestrate energy generation, storage, conversion between power and heat, and controllable loads to achieve a match between supply and demand of power and energy for a whole day that reduces cost, increases profit, reduces carbon intensity, or a combination thereof. The control framework described herein enables receiving constraints on certain operating parameter(s) imposed by the top-level plan or schedule. The short-term controllers also receive input from the local hardware controllers and/or other controllers (e.g., the local environment controller) to perform enhanced controls at the second level. The input may include element type, model parameter, other suitable parameter(s) of the local hardware and/or equipment, or a combination thereof. As the one or more near-term portions of the long-term operational schedule are executed by the short-term controllers, the system models may simulate plausible scenarios and generate system states.

At process block 258, the long-term controller may receive system states from the short-term controllers. The system states may include feedback after executing the one or more near-term portions of the long-term operational schedule, such as energy flows, state of charge for storage systems, state of health of equipment (e.g., local hardware), expected end-of-useful-life, performance degradation trend, and so forth.

At process block 260, the long-term controller may monitor compliance of system states to certain requirements, such as system-related and/or business-related constraints (e.g., capital investment, energy consumption, minimum energy output, etc.). The monitoring may be based on simulations executed by the predictive model based on received system states from the short-term controllers. The monitoring process may identify/detect a divergence in which future system states (e.g., forecasted based on simulations of various scenarios associated with the distributed energy resource system) diverge from compliance requirements.

At process block 262, the long-term controller may determine if a divergence is detected. If a divergence is detected, the energy management system may automatically trigger the long-term controller to re-plan the long-term operational schedule. The updated long-term operational schedule may either be deployed automatically to the short-term controllers 204 at the second level or communicated to a human decision-maker for authorization. For example, in certain embodiments, human decisions (e.g., operator's decision) may be used to determine if a re-plan is desirable.

If, at the process block 262, the long-term controller determines that no divergence is detected, the process 250 may return to the process block 258 to continuously receive system states from the short-term controllers and monitor compliance of system states for detecting possible divergence(s).

The local component controllers (e.g., the load controllers, the renewable energy generation element controller, the energy storage element controller) and the aggregators (e.g., the measurements aggregator) may rapidly adjust the local hardware to control operation of the distributed energy resource system at the third level based on one or more updated near-term portions of the updated long-term operational schedule, one or more instructions, or a combination thereof, from the one or more short-term controllers.

The long-term controller and the short-term controllers may be implemented in a single computing device (e.g., a server, a desktop computer, a laptop, a tablet, etc.), or the short-term controllers may be implemented in different computing device(s) (e.g., a different computing device for each short-term controller, a different computing device from the top-level controller, etc.) as external simulator(s) located elsewhere (e.g., on a cloud).

Example Applications of Design and Operation

In one embodiment, a distributed energy resource system under design may include a ground-source heat pump system in closed-loop, which may be coupled to a solar photovoltaic (PV) model and/or a thermal model, a dry-air heat exchanger, and an auxiliary source (such as a gas boiler and/or a chiller). The distributed energy resource system with such complexities may be designed based on at least, but not limited to, one of the following criteria, including initial investment cost (CAPEX), operation costs (OPEX) that includes cost of electricity, gas, and/or maintenance, leveled cost of energy on a lifetime of the distributed energy resource system, or $CO_2$/greenhouse gas (GHG) emissions (e.g., both yearly or form lifecycle, including the manufacturing of equipment).

For instance, if a project goal is to reduce (e.g., minimize) the CO2 emissions, the output of a design process may include reducing or eliminating the auxiliary gas boiler(s), therefore increasing numbers of geothermal wells and capacities of heat pumps, and thus the CAPEX. The energy management system may also reduce (e.g., minimize) the predicted OPEX with, for instance, the use of solar a thermal model that may recharge the geothermal wells during the summer, therefore improving performance of the heat pumps during the winter and reducing electricity consumptions. Additionally, as the ground temperature is higher in the summer than in the winter, the energy management system may facilitate inter-seasonal thermal storage.

In one embodiment, an enhanced operation of the distributed energy resource system enables maintaining an enhanced performance over a system lifetime (e.g. 25 years). For instance, a temperature of a fluid circulating in closed-loop within geothermal wells may be constantly below a pre-defined range (e.g., between −3 C and 40 C). Such enhanced operation may involve predictive model-based planning at multiple time scales (e.g., the temperature of the fluid is estimated using the predictive model on a regular basis (e.g., 1 week, 1 month, 1 quarter)).

In another embodiment, thermal inertia of a building may be used to shift loads and benefit from lower electricity prices. An optimization-based control using thermal inertia may use forecasts of electricity price, weather, and the building energy consumption as inputs.

The energy management system may improve over time by learning (e.g., using machine learning) behaviors of a building (including the thermal inertia and energy consumption) and of individual energy resources. The energy management system also enables detection/prediction of faults (e.g., prognostic health management on the heat pumps) and that may trigger a variety of actions, including a remote corrective action to prevent a fault, sending a team on site to correct and/or prevent a fault, mitigating impact of non-operational equipment during maintenance (e.g., based on a prediction/plan), and so forth. Such fault detection/prediction may improve client experience and reduce operation and/or maintenance costs.

Technical effects of the disclosure include enhancing the design and operation of a distributed energy resource system that includes a variety of renewable energy resources. Such enhanced design and control may be based on predictive models and may use forecast models to estimate system states based on current design and/or an operational schedule, and automatically adjust the design and/or operational schedule accordingly. In certain embodiments, a target deployment location (e.g., a building) may already have a local control system (e.g., local temperature control system) to control room (e.g. office) temperature. The disclosed techniques may enable dynamically adjusting energy management at higher level(s) to achieve better goals, such as reducing cost, increasing profit or reducing carbon intensity on both a short-term scale (e.g., one day) and/or a long-term scale (e.g., one year or longer).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An energy management system for a distributed energy resource system including a plurality of local energy sub-systems, wherein the plurality of local energy sub-systems includes a heat pump sub-system including a heat pump and a geothermal system, comprising:
  a design system configured to provide a design for a distributed energy resource system to be developed and to enhance a design for an established distributed energy resource system in response to certain changes in the established distributed energy resource system, comprising:
    a plurality of bottom-level designers configured to generate detailed designs of a plurality of local energy sub-systems, wherein the plurality of bottom-level designers includes a heat pump sub-system designer including: a heat pump and surface piping model and a subsurface model;
    a top-level designer configured to coordinate the plurality of bottom-level designers to seek a top-level global design based on design input for the distributed energy resource system;
      wherein the energy management system utilizes a result of one or more forecast models as a portion of the design input, and wherein the result of the one or more forecast models comprise at least one variable, including energy price, energy demand, energy generation, environmental factors energy storage capacity, or combination thereof, and at least an uncertainty relative to the at least one variable,
      wherein the top-level global design satisfies an energy demand of a target deployment location taking into account the at least one uncertainty related to the design input, wherein each of the detailed designs of the plurality of local energy sub-systems takes into account the design input to generate the detailed design and wherein the top-level designer utilizes at least a portion of the detailed designs to update the top-level global design; and
    a user interface configured to output the top-level global design and the detailed designs to facilitate construction of the distributed energy resource system including one or more geothermal wells and the heat pump using design parameters of the detailed designs; and
  a control system configured to provide control for the distributed energy resource system including the one or more geothermal wells and the heat pump during operation of the distributed energy resource system using design parameters of the top-level design.

2. The energy management system of claim 1, wherein the distributed energy resource system is utilized for one or more residences, one or more commercial and industrial facilities, one or more multi-building commercial and industrial sites, one or more university campuses, one or more schools, one or more hospitals, one or more municipalities, one or more remote locations, or a combination thereof.

3. The energy management system of claim 1, wherein the design input comprises user-input comprising a project capital investment, a project payback time, distributed energy resource system operating costs, or distributed energy resource system carbon intensity, or a combination thereof.

4. The energy management system of claim 1, wherein a plurality of functionalities of the detailed designs are provided by a plurality of external design models or software.

5. The system of claim 1, wherein the design input includes power grid stability constraints, thermal comfort levels, energy price forecasts, energy demand forecasts, building energy models, energy generation forecasts, solar photovoltaic (PV) models, subsurface models, surface footprint limits, capital investment or capital expense (CAPEX) limits, operation costs (OPEX), leveled cost of energy on a lifetime of the distributed energy resource system, $CO_2$/greenhouse gas (GHG) emissions or combinations thereof.

6. The system of claim 1, wherein the top-level designer is configured to provide constraints to the bottom-level designer, wherein the constraints include heat transfer, fluid temperature, heat capacity of ground for thermal storage, or a combination thereof.

7. The system of claim 1, wherein the detailed designs for the heat pump sub-system include one or more of a number of heat exchangers to be deployed, depths of the heat exchanges to be disposed within respective wellbores/boreholes within the ground, number of inlet and outlet conduits to be deployed.

8. A method for designing a distributed energy resource system including a plurality of local energy sub-systems, wherein the plurality of local energy sub-systems includes a heat pump system including a heat pump and a geothermal system comprising:
  receiving, via a top-level designer, design input data, wherein the design input data includes a result of one or more forecast models, wherein the result of the one or more forecast models comprise at least one variable including energy price, energy demand, energy generation, environmental factors, energy storage capacity, or combination thereof, and at least one uncertainty relative to the at least one variable;
  determining, via the top-level designer, a top-level design by reducing a first object function based on the design input data and input data from a plurality of bottom-level designers;
  outputting, via the top-level designer, constraints to the plurality of bottom-level designers via an interface, wherein the bottom-level designers include a heat pump sub-system designer including a heat pump and surface piping model and a subsurface model;
  generating the detailed designs via the bottom-level designers taking into account the constraints;
  receiving, via the top-level designer, an initial design and design results from the plurality of bottom-level designers via the interface, wherein the received initial design and the design result are used by the top-level designer for iterative refinements to the top-level design;

outputting the top-level design to facilitate construction of the distributed energy resource system including one or more geothermal wells and the heat pump using design parameters of the top-level design; and controlling, via an energy management system, the distributed energy resource system including the one or more geothermal wells and the heat pump during operation of the distributed energy resource system using design parameters of the top-level design.

9. The method of claim 8, comprising characterizing an energy consumption of the distributed energy resource system at a target deployment location level, at an aggregated location level, at a facility level, at an appliance level, or at a piping level.

10. The method of claim 9, wherein the energy consumption of the distributed energy resource system is provided by a plurality of external design models or software.

11. The method of claim 9, wherein the energy consumption of the distributed energy resource system is characterized from operation data of energy producing resources in the distributed energy resource system.

12. The method of claim 8, wherein the design input data comprises user preferences, utility operator constraints, or a combination thereof.

13. The method of claim 8, comprising, after the distributed energy resource system is deployed in a target location and is in operation:
receiving, via a primary controller, control input data for long-term operational control;
determining, via the primary controller, a long-term operational schedule by reducing a second object function based on the control input data;
generating, via the primary controller, a plurality of constraints based on one or more near-term portions of the long-term operational schedule;
outputting, via the primary controller, the plurality of constraints to a plurality of secondary controllers;
receiving, via the primary controller, a plurality of system states from the plurality of secondary controllers;
monitoring, via the primary controller and the plurality of secondary controllers, a compliance of the plurality of system states with a plurality of requirements;
in response to detecting a divergence between the plurality of system states and the plurality of requirements, triggering the primary controller to update the long-term operation schedule;
send one or more updated near-term portions of the updated long-term operational schedule to the plurality of secondary controllers to adjust daily or short-term operations of the distributed energy resource system; and
adjusting, via a plurality of tertiary controllers, operation of a plurality of hardware to control operation of the distributed energy resource system based on the one or more updated near-term portions of the updated long-term operational schedule, one or more instructions, or a combination thereof.

14. The method of claim 13, wherein the primary controller or the one or more secondary controller utilize the result of one or more forecast models as inputs.

15. The method of claim 13, wherein the result of the one or more forecast models comprises energy price, energy demand, energy generation, environmental factors, or energy storage capacity.

16. The method of claim 13, wherein a dynamic predictive model of the distributed energy resource system is used to simulate plausible scenarios to monitor the compliance to the plurality of requirements, wherein the plurality of requirements comprises system-related or business-related constraints.

17. The method of claim 8, wherein the design input data includes power grid stability constraints, thermal comfort levels, energy price forecasts, energy demand forecasts, building energy models, energy generation forecasts, solar photovoltaic (PV) models, subsurface models, surface footprint limits, capital investment or capital expense (CAPEX) limits, operation costs (OPEX), leveled cost of energy on a lifetime of the distributed energy resource system, $CO_2$/greenhouse gas (GHG) emissions or combinations thereof.

18. The method of claim 8, wherein the detailed designs for the heat pump sub-system include one or more of a number of heat exchangers to be deployed, depths of the heat exchanges to be disposed within respective wellbores/boreholes within the ground, number of inlet and outlet conduits to be deployed.

19. The method of claim 8, wherein the constraints include heat transfer, fluid temperature, heat capacity of ground for thermal storage, or a combination thereof.

20. A method for designing a distributed energy resource system including a plurality of local energy sub-systems, wherein the plurality of local energy sub-systems includes a heat pump system including a heat pump and a geothermal system comprising:
receiving, via a trained machine learning model top-level designer, design input data, wherein the design input data includes the result of one or more forecast models, wherein the result of the one or more forecast models comprise at least one variable including energy price, energy demand, energy generation, environmental factors, energy storage capacity, or combination thereof, and at least one uncertainty relative to the at least one variable;
determining, via the trained machine learning model top-level designer, a top-level design by reducing a first object function based on the design input data and input data from a plurality of bottom-level designers;
outputting, via the trained machine learning model top-level designer, constraints to the plurality of bottom-level designers via an interface, wherein the bottom-level designers include a heat pump sub-system designer including a heat pump and surface piping model and a subsurface model;
generating the detailed designs via the bottom-level designers taking into account the constraints;
receiving, via the trained machine learning model top-level designer, an initial design and design results from the plurality of bottom-level designers via the interface, wherein the received initial design and the design result are used by the top-level designer for iterative refinements to the top-level design; and
controlling, via a control system, the distributed energy resource system including one or more geothermal wells and the heat pump during operation of the distributed energy resource system using design parameters of the top-level design.

* * * * *